(12) United States Patent
Quicquaro

(10) Patent No.: US 11,390,221 B1
(45) Date of Patent: Jul. 19, 2022

(54) PIVOTABLE VEHICLE TRAY

(71) Applicant: Joseph Michael Quicquaro, Westerville, OH (US)

(72) Inventor: Joseph Michael Quicquaro, Westerville, OH (US)

(*) Notice: Subject to any disclaimer, the term of this patent is extended or adjusted under 35 U.S.C. 154(b) by 239 days.

(21) Appl. No.: 16/742,777

(22) Filed: Jan. 14, 2020

Related U.S. Application Data

(60) Provisional application No. 62/792,843, filed on Jan. 15, 2019.

(51) Int. Cl.
*B60R 7/08* (2006.01)
*B60R 7/04* (2006.01)
*B60R 11/00* (2006.01)
*B60R 11/02* (2006.01)

(52) U.S. Cl.
CPC .............. *B60R 7/08* (2013.01); *B60R 7/04* (2013.01); *B60R 11/0252* (2013.01); *B60R 2011/0029* (2013.01); *B60R 2011/0087* (2013.01)

(58) Field of Classification Search
CPC ......... B60R 7/08; B60R 7/04; B60R 11/0252; B60R 2011/0029; B60R 2011/0087
USPC ....................................................... 224/275
See application file for complete search history.

(56) References Cited

U.S. PATENT DOCUMENTS

| | | | |
|---|---|---|---|
| 5,035,464 A * | 7/1991 | Spallholtz | A47C 7/70 297/144 |
| 5,667,272 A | 9/1997 | Sutton | |
| 5,979,724 A | 11/1999 | Loewenthal, Jr. et al. | |
| 6,142,559 A * | 11/2000 | Sorel | A47C 7/68 297/135 |
| 6,793,281 B2 | 9/2004 | Duerr et al. | |
| D519,915 S | 5/2006 | Eskandry | |
| 7,143,701 B2 * | 12/2006 | Lindstrom | B60N 3/002 108/44 |
| 7,464,988 B2 | 12/2008 | Hassett et al. | |
| 7,478,870 B2 | 1/2009 | Hassett et al. | |
| 7,810,880 B2 * | 10/2010 | Spellman | B60R 11/00 297/188.06 |
| 8,056,970 B1 | 11/2011 | Phillips | |
| 8,267,291 B2 | 9/2012 | Simon et al. | |
| 8,272,686 B1 | 9/2012 | Arnold et al. | |

(Continued)

OTHER PUBLICATIONS

"Thule Side Seat Organizer", Amazon Website, Web page <https://www.amazon.com/Thule-Side-Seat-Organizer/dp/B000GT51FO?th=1&psc=1>, 5 pages, dated Aug. 12, 2009, retrieved from www.amazon.com website on Dec. 5, 2020.
"Charminer Car Seat Filler, 2 Pack PU Car Seat Organizer, Car Seat Storage with Cup Holder, Seat Console Side Pocket for . . . ", Marvel Products Online, Web page <https://marvelproductsonline.com/product/charminer-car-seat-filler-pu-leather-car-seat-organizer-with-cup-holder-seat-console-side-pocket-for-cellphones-keys-cards-wallets-sunglasses-etc-2-pack/>, 4 pages, dated as early as Dec. 2020, retrieved from https://marvelproductsonline.com website on Dec. 5, 2020.

(Continued)

*Primary Examiner* — Derek J Battisti
(74) *Attorney, Agent, or Firm* — The Law Office of Patrick F. O'Reilly, III, LLC

(57) ABSTRACT

A pivotable vehicle tray is disclosed herein. The pivotable vehicle tray includes a tray member, the tray member having a top surface and a bottom surface oppositely disposed relative to the top surface, the top surface configured to function as a work surface and/or an eating surface for accommodating a driver or passenger in a vehicle; and a vertical support member coupled to the bottom surface of the tray member, the vertical support member configured to be inserted in a space between a seat of the vehicle and a console of the vehicle, the tray member being pivotable relative to the vertical support member.

20 Claims, 14 Drawing Sheets

(56) References Cited

U.S. PATENT DOCUMENTS

| | | | |
|---|---|---|---|
| 8,359,982 B2* | 1/2013 | Lebel | A47B 23/043 108/44 |
| 8,448,581 B2* | 5/2013 | Hanna | B64D 11/0646 108/44 |
| 2002/0003361 A1* | 1/2002 | Duerr | B64D 11/0638 297/147 |
| 2002/0134807 A1* | 9/2002 | Kim | B60N 2/793 224/542 |
| 2006/0091169 A1* | 5/2006 | Lippert | B60R 7/043 224/275 |
| 2015/0329062 A1* | 11/2015 | Ackeret | B60N 3/002 248/220.22 |
| 2016/0137136 A1* | 5/2016 | Mellenthin | B60R 7/08 224/275 |
| 2016/0375810 A1* | 12/2016 | Kong | B60N 2/793 297/145 |
| 2018/0339630 A1* | 11/2018 | Akaike | B64D 11/0626 |

OTHER PUBLICATIONS

"Thule Console Caddy", Amazon Website, Web page <https://www.amazon.com/thule-7031-console-caddy-organizer/dp/b000gt70jo>, 4 pages, dated Mar. 23, 2004, retrieved from www.amazon.com website on Dec. 5, 2020.

\* cited by examiner

Section A-A

Detail A

Detail B

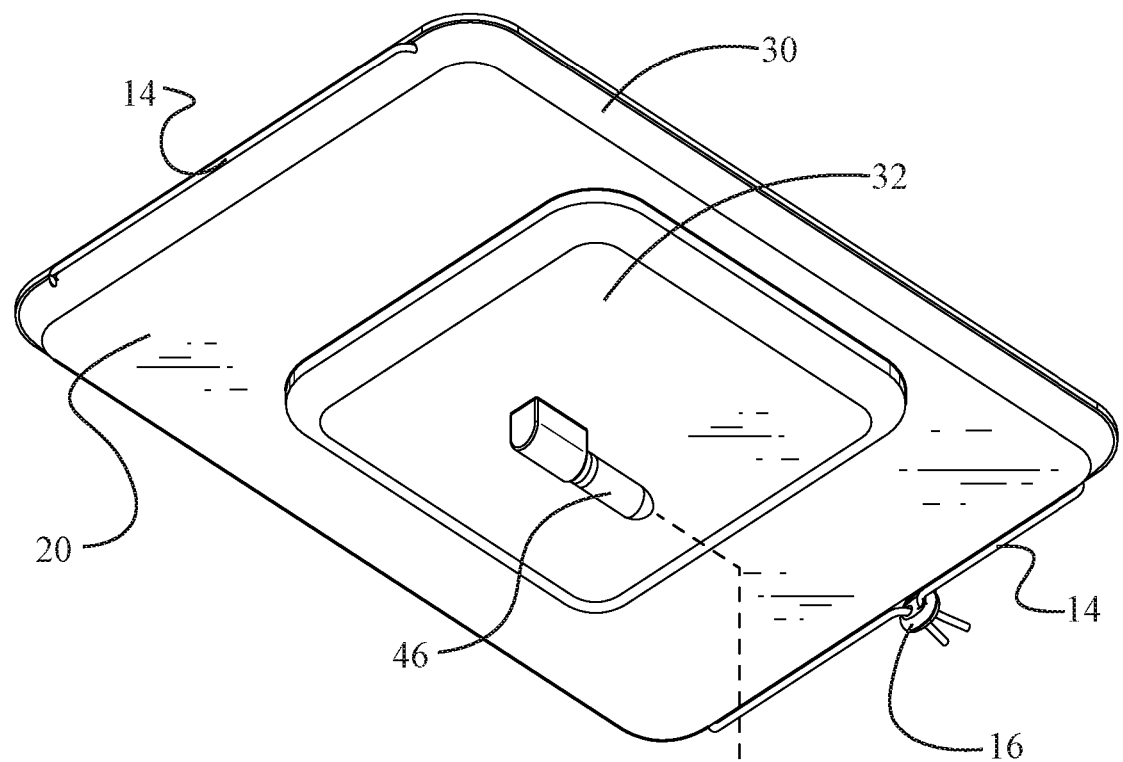
FIG. 11
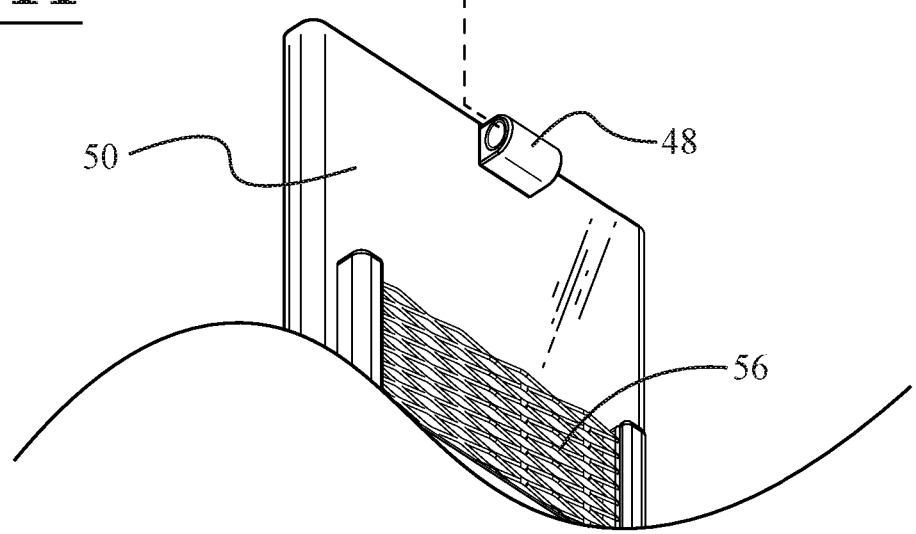

Detail "C"

Detail "D"

PIVOTABLE VEHICLE TRAY

CROSS-REFERENCE TO RELATED APPLICATIONS

This patent application claims priority to, and incorporates by reference in its entirety, U.S. Provisional Patent Application No. 62/792,843, entitled "Pivotable Vehicle Tray", filed on Jan. 15, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a pivotable vehicle tray. More particularly, the invention relates to a pivotable vehicle tray that is configured to be used in the passenger compartment of a vehicle, such as in the passenger compartment of a car or truck.

2. Background

Many individuals have occupations where they spend a significant amount of time traveling in a vehicle (i.e., in a car or truck). While on the road, these individuals typically perform multiple tasks in their vehicle. For example, while at a rest stop or in the parking lot of a restaurant or gasoline station, these individuals may make phone calls, work on a laptop computer, and/or eat a meal in their vehicle. In many cases, the vehicles of these individuals serve as mobile office spaces where a plurality of different tasks are performed in order to make their time on the road more productive.

However, the typical vehicle passenger compartment is not readily conducive to performing the aforedescribed tasks because it does not contain a flat surface of sufficient size that is able to provide a writing surface, a surface for holding a laptop computer, and/or an eating surface. In addition, any type of permanent surface for performing these tasks would most likely interfere with the normal use of the vehicle passenger compartment because it would obstruct one or more seats of the vehicle passenger compartment and/or obstruct one or more operational controls of the vehicle, such as the gear shift lever or portions of the dashboard.

Therefore, what is needed is a pivotable vehicle tray that is able to provide a generally flat working surface and/or eating surface for accommodating various tasks in a vehicle passenger compartment. Moreover, a pivotable vehicle tray is needed that is collapsible so as to not interfere with the typical use of the vehicle passenger compartment when the vehicle tray is not being used. Furthermore, there is a need for a pivotable vehicle tray that is configured to be inserted in a space between a seat of the vehicle and a console of the vehicle.

BRIEF SUMMARY OF EMBODIMENTS OF THE INVENTION

Accordingly, the present invention is directed to a vehicle tray that substantially obviates one or more problems resulting from the limitations and deficiencies of the related art.

In accordance with one or more embodiments of the present invention, there is provided a pivotable vehicle tray that includes a tray member, the tray member having a top surface and a bottom surface oppositely disposed relative to the top surface, the top surface configured to function as a work surface and/or an eating surface for accommodating a driver or passenger in a vehicle; and a vertical support member coupled to the bottom surface of the tray member, the vertical support member configured to be inserted in a space between a seat of the vehicle and a console of the vehicle, the tray member being pivotable relative to the vertical support member.

In a further embodiment of the present invention, the tray member comprises one or more securement cords configured to prevent a movement of one or more objects disposed on the top surface of the tray member.

In yet a further embodiment, the pivotable vehicle tray further comprises a slip-resistant pad disposed on the top surface of the tray member, the slip-resistant pad configured to prevent one or more objects from sliding off the top surface of the tray member.

In still a further embodiment, the tray member is pivotable relative to the vertical support member about a vertical rotational axis.

In yet a further embodiment, the tray member comprises an upturned peripheral edge disposed about a periphery of the tray member, the upturned peripheral edge configured to prevent one or more objects from sliding off the top surface of the tray member.

In still a further embodiment, the pivotable vehicle tray further comprises a tray mounting plate attached to the bottom surface of the tray member, the tray mounting plate being pivotably coupled to the vertical support member.

In yet a further embodiment, the pivotable vehicle tray further comprises a hinge member pivotably coupling the tray mounting plate to the vertical support member, the hinge member defining a horizontal rotational axis about which the tray member is rotatable, the tray member being rotatable between an operative horizontal position and a collapsed vertical position.

In still a further embodiment, the pivotable vehicle tray further comprises a latching device, the latching device configured to prevent the rotation of the tray member about the horizontal rotational axis so as to maintain the tray member in the operative horizontal position.

In yet a further embodiment, the pivotable vehicle tray further comprises a mobile phone holder disposed on a side of the vertical support member, the mobile phone holder defining a pocket for accommodating a mobile phone in the pocket.

In still a further embodiment, the pivotable vehicle tray further comprises a detachable insert member disposed on a side of the vertical support member, the detachable insert member configured to be selectively attached to, and detached from, the vertical support member by a user, the detachable insert member configured to enable the vertical support member to fit more snugly in the space between the seat of the vehicle and the console of the vehicle.

In yet a further embodiment, the pivotable vehicle tray further comprises a vertical extension member configured to be attached to a bottom edge of the vertical support member, the vertical extension member configured to increase an overall height of the tray member relative to a floor of the vehicle so as to enable the pivotable vehicle tray to accommodate a deep space between the seat of the vehicle and the console of the vehicle.

In still a further embodiment, the pivotable vehicle tray further comprises a connector strap configured to secure the vertical support member of the pivotable vehicle tray to a seat belt receptacle of the vehicle so as to prevent the movement of the pivotable vehicle tray in the vehicle.

In accordance with one or more other embodiments of the present invention, there is provided a pivotable vehicle tray that includes a tray member, the tray member having a top surface and a bottom surface oppositely disposed relative to the top surface, the top surface configured to function as a work surface and/or an eating surface for accommodating a driver or passenger in a vehicle; and a vertical support member coupled to the bottom surface of the tray member, the vertical support member configured to be inserted in a space between a seat of the vehicle and a console of the vehicle, the tray member being pivotable about a horizontal rotational axis relative to the vertical support member between an operative horizontal position and a collapsed vertical position.

In a further embodiment of the present invention, the tray member is further pivotable relative to the vertical support member about a vertical rotational axis.

In yet a further embodiment, the tray member comprises an upturned peripheral edge disposed about a periphery of the tray member, the upturned peripheral edge configured to prevent one or more objects from sliding off the top surface of the tray member.

In still a further embodiment, the pivotable vehicle tray further comprises a tray mounting plate attached to the bottom surface of the tray member, the tray mounting plate being pivotably coupled to the vertical support member about the horizontal rotational axis.

In yet a further embodiment, the pivotable vehicle tray further comprises a hinge member pivotably coupling the tray mounting plate to the vertical support member, the horizontal rotational axis being defined by the hinge member.

In still a further embodiment, the pivotable vehicle tray further comprises a latching device, the latching device configured to prevent the rotation of the tray member about the horizontal rotational axis so as to maintain the tray member in the operative horizontal position.

In yet a further embodiment, the pivotable vehicle tray further comprises a mobile phone holder disposed on a side of the vertical support member, the mobile phone holder defining a pocket for accommodating a mobile phone in the pocket.

In still a further embodiment, the pivotable vehicle tray further comprises a detachable insert member disposed on a side of the vertical support member, the detachable insert member configured to be selectively attached to, and detached from, the vertical support member by a user, the detachable insert member configured to enable the vertical support member to fit more snugly in the space between the seat of the vehicle and the console of the vehicle.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 11 is an enlarged, partial bottom-side perspective view of the pivotable vehicle tray of FIG. 1, wherein the tray member is shown detached from the vertical support member of the pivotable vehicle tray;

Throughout the figures, the same parts are always denoted using the same reference characters so that, as a general rule, they will only be described once.

DETAILED DESCRIPTION OF EMBODIMENTS OF THE INVENTION

Figure 5:
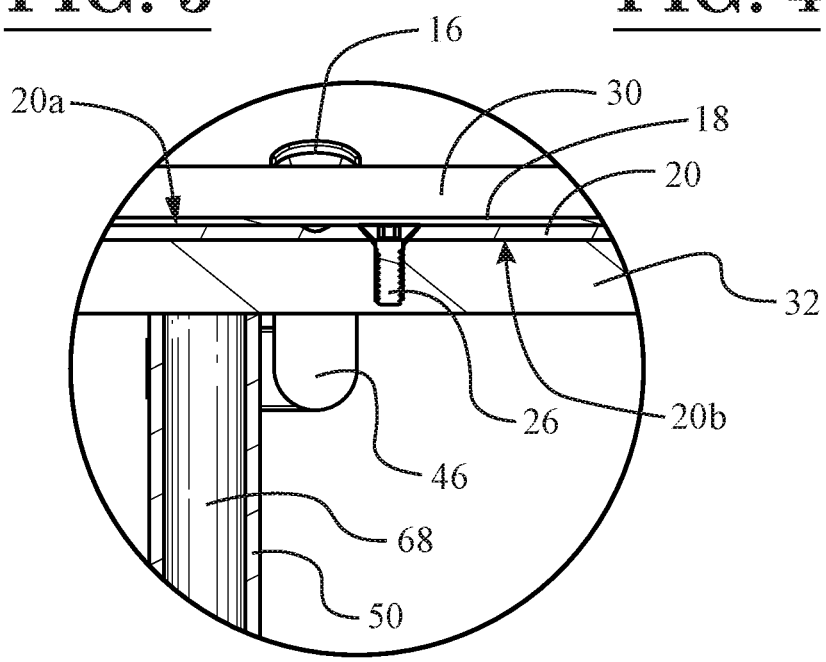
FIG. 5 is a partial sectional view cut through the tray member and the vertical support member of the pivotable vehicle tray of FIG. 1, wherein the section is generally cut along the cutting-plane line A-A in FIG. 8.
Figure 9:
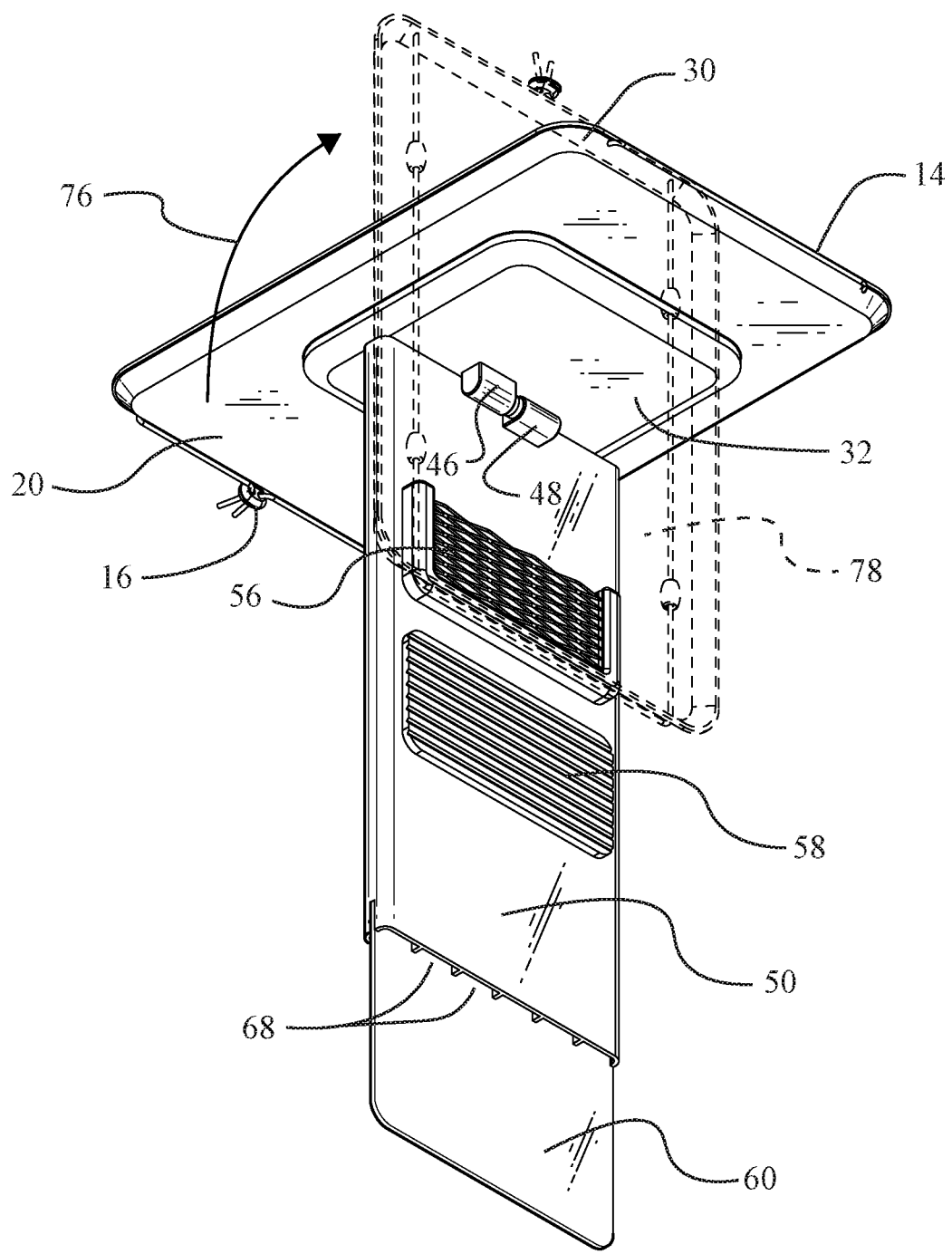
FIG. 9 is another bottom-side perspective view of the pivotable vehicle tray of FIG. 1, wherein the collapsed position of the tray member is depicted in dashed lines.

An illustrative embodiment of a pivotable vehicle tray is seen generally at 10 in FIGS. 1-4 and 12. Initially, as shown in the perspective view of FIG. 1, the illustrative pivotable vehicle tray 10 generally comprises a tray member 20, the tray member 20 having a top surface 20a and a bottom surface 20b oppositely disposed relative to the top surface 20a (see FIG. 5), the top surface 20a configured to function as a work surface and/or an eating surface for accommodating a driver or passenger in a vehicle; and a vertical support member 50 coupled to the bottom surface 20b of the tray member 20, the vertical support member 50 configured to be inserted in a space 92 between a seat 86 of the vehicle and a console 88 of the vehicle (see FIG. 15), the tray member 20 being pivotable about a horizontal rotational axis relative to the vertical support member 50 between an operative horizontal position and a collapsed vertical position (see the collapsed vertical position 78 of the tray member 20 in FIG. 9). In FIG. 9, the direction of rotation of the tray member 20 from the operative horizontal position to the collapsed vertical position is diagrammatically depicted by the curved arrow 76.

Initially, referring again to FIGS. 1-5, the tray member 20 of the illustrative pivotable vehicle tray 10 will be described. In the illustrative embodiment, the tray member 20 comprises a flat planar body portion with an upturned peripheral edge 30 disposed about a periphery of the tray member 20 (see FIGS. 1 and 2). The upturned peripheral edge 30 is configured to prevent one or more objects from sliding off the top surface 20a of the tray member 20. Advantageously, the flat planar body portion of the tray member 20 provides a large horizontal surface for the user so that the user is able to far more easily work or eat in the vehicle. Also, in the illustrative embodiment, the pivotable vehicle tray 10 further comprises a tray mounting plate 32 attached to the bottom surface 20b of the tray member 20. Because the tray mounting plate 32 has a thickness that is substantially greater than the tray member 20, the tray mounting plate 32 significantly increases the structural rigidity of the tray member 20. The tray mounting plate 32 is pivotably coupled to the vertical support member 50 about the horizontal rotational axis that passes through the center of the hinge member 44 that will be described hereinafter.

In the illustrative embodiment, the tray mounting plate 32 has a generally square shape. However, in other embodiments, the tray mounting plate 32 may have different shapes, such as a circular shape or a rectangular shape.

Figure 8:
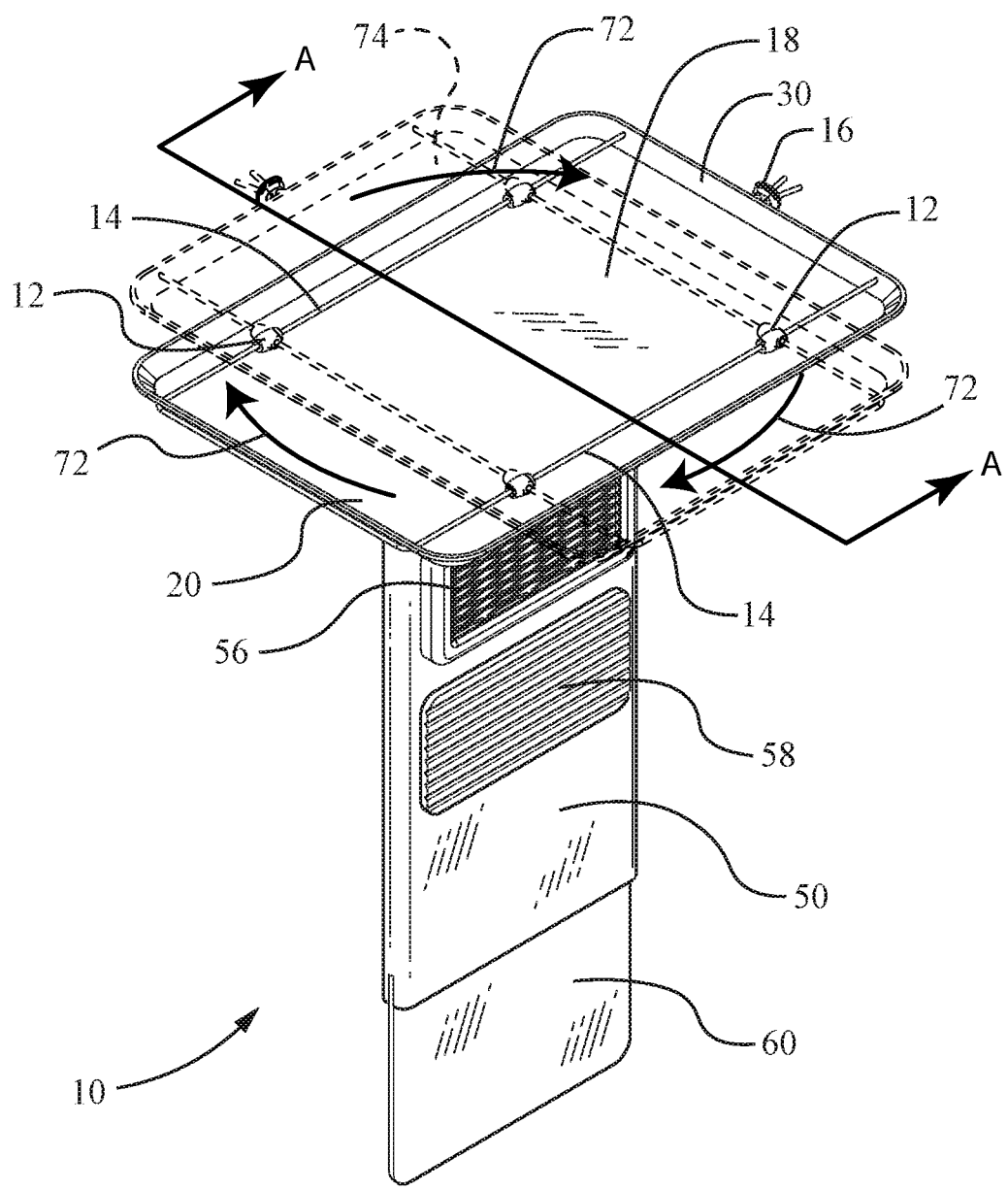
FIG. 8 is another top-side perspective view of the pivotable vehicle tray of FIG. 1, wherein the rotational adjustment of the tray member of the pivotable vehicle tray is depicted (i.e., a rotated position of the tray member is depicted in dashed lines)

As shown in the illustrative embodiment of FIG. 8, in addition to being pivotally collapsible about a horizontal rotational axis, the tray member 20 is further pivotable relative to the vertical support member 50 about a vertical rotational axis (as indicated by the curved rotational arrows 72 in FIG. 8). More specifically, as shown in the sectional view of FIG. 5, the tray member 20 is able to pivot 360 degrees about the fastener member 26 (e.g., a screw 26) that attaches the tray member 20 to the tray mounting plate 32. The fastener member 26 passes through a fastener aperture 28 in the tray member 20 (see FIG. 12), and a corresponding fastener aperture in the tray mounting plate 32. In FIG. 8, the rotated position 74 of the tray member 20 is indicated in dashed lines (i.e., the tray member 20 has been rotated 90 degrees about the fastener member 26 within a horizontal plane). In the illustrative embodiment, the vertical rotational axis of the tray member 20 extends longitudinally through the center of the fastener member 26.

Figure 1:
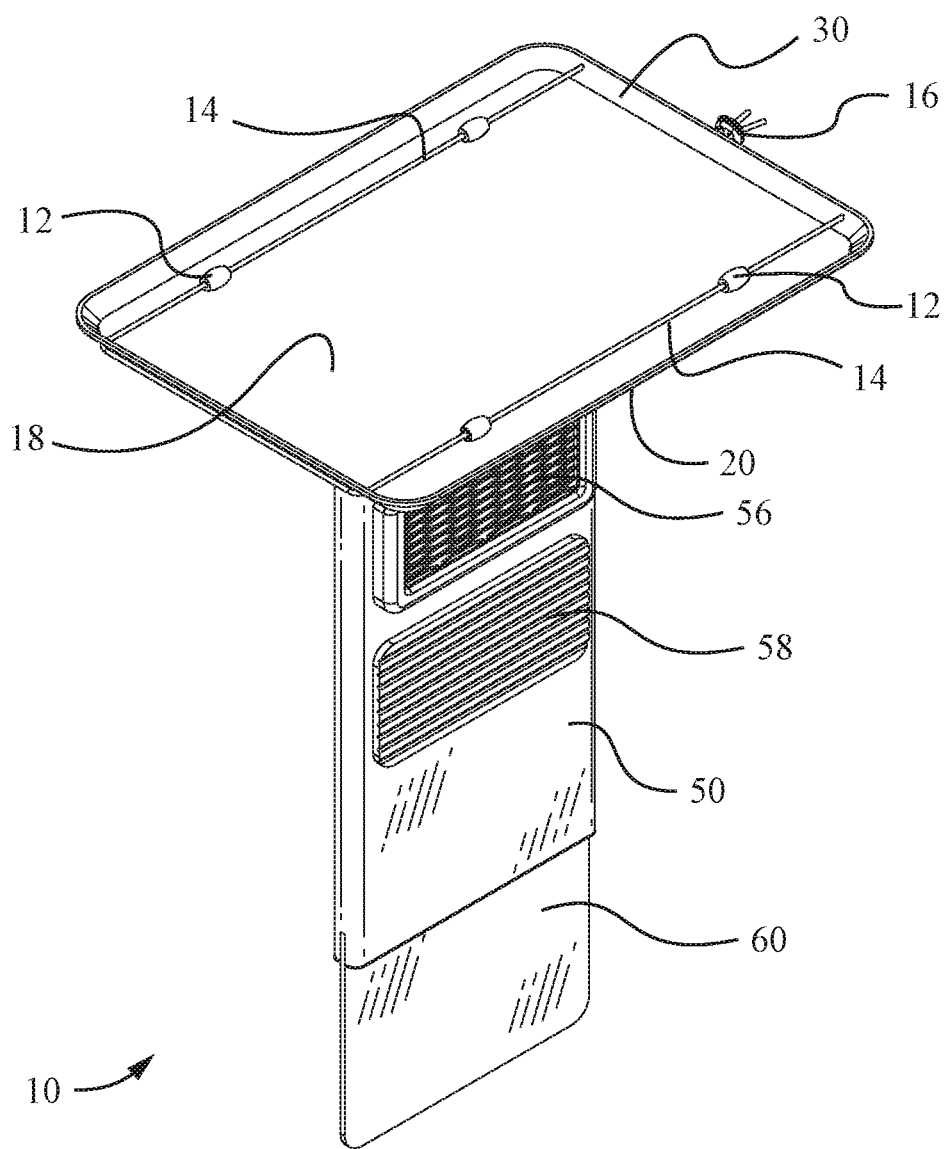
FIG. 1 is a top-side perspective view of a pivotable vehicle tray, according to an illustrative embodiment of the invention, wherein the tray member of the pivotable vehicle tray is disposed in its operative horizontal position.
Figure 2:
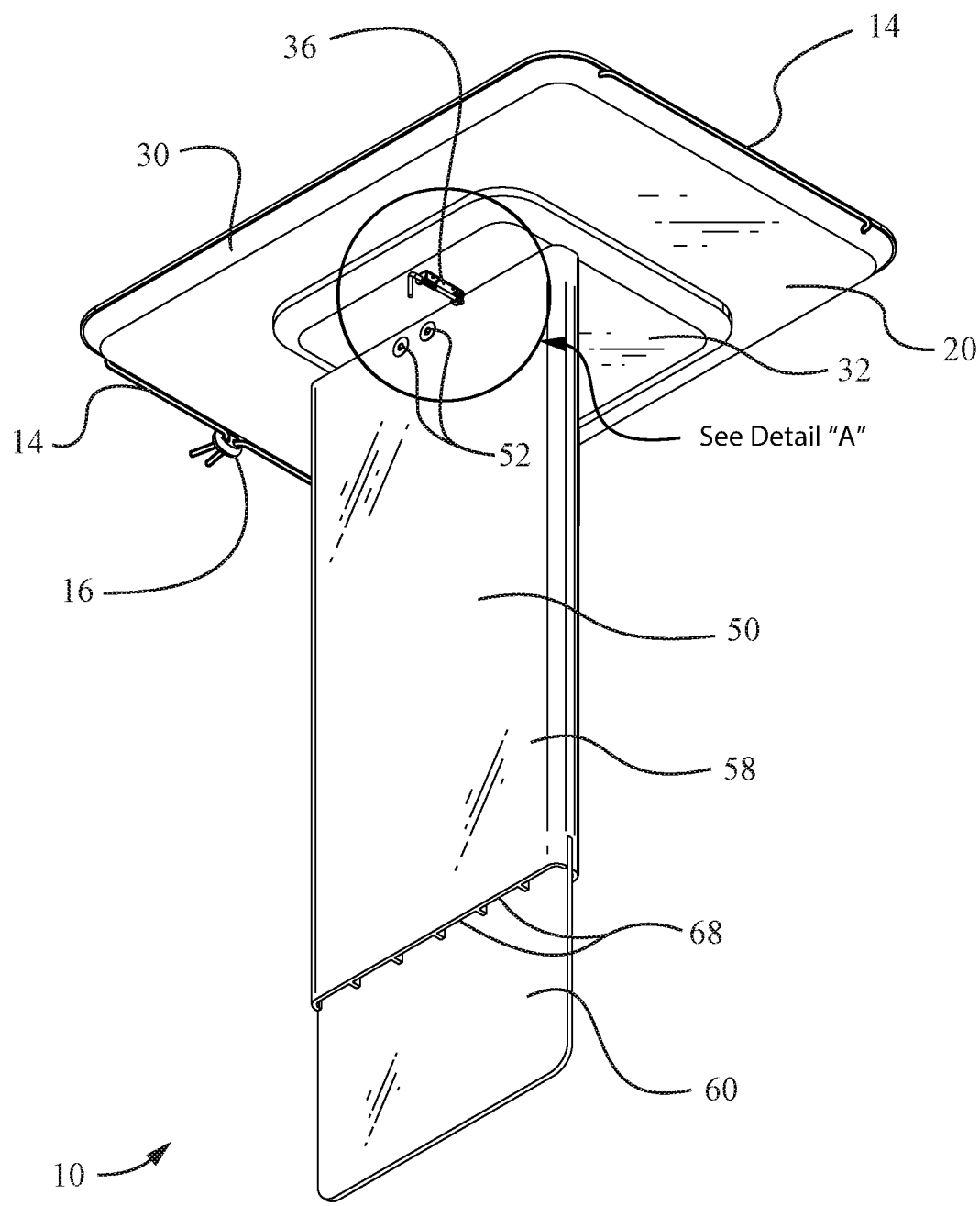
FIG. 2 is a bottom-side perspective view of the pivotable vehicle tray of FIG. 1.
Figure 12:
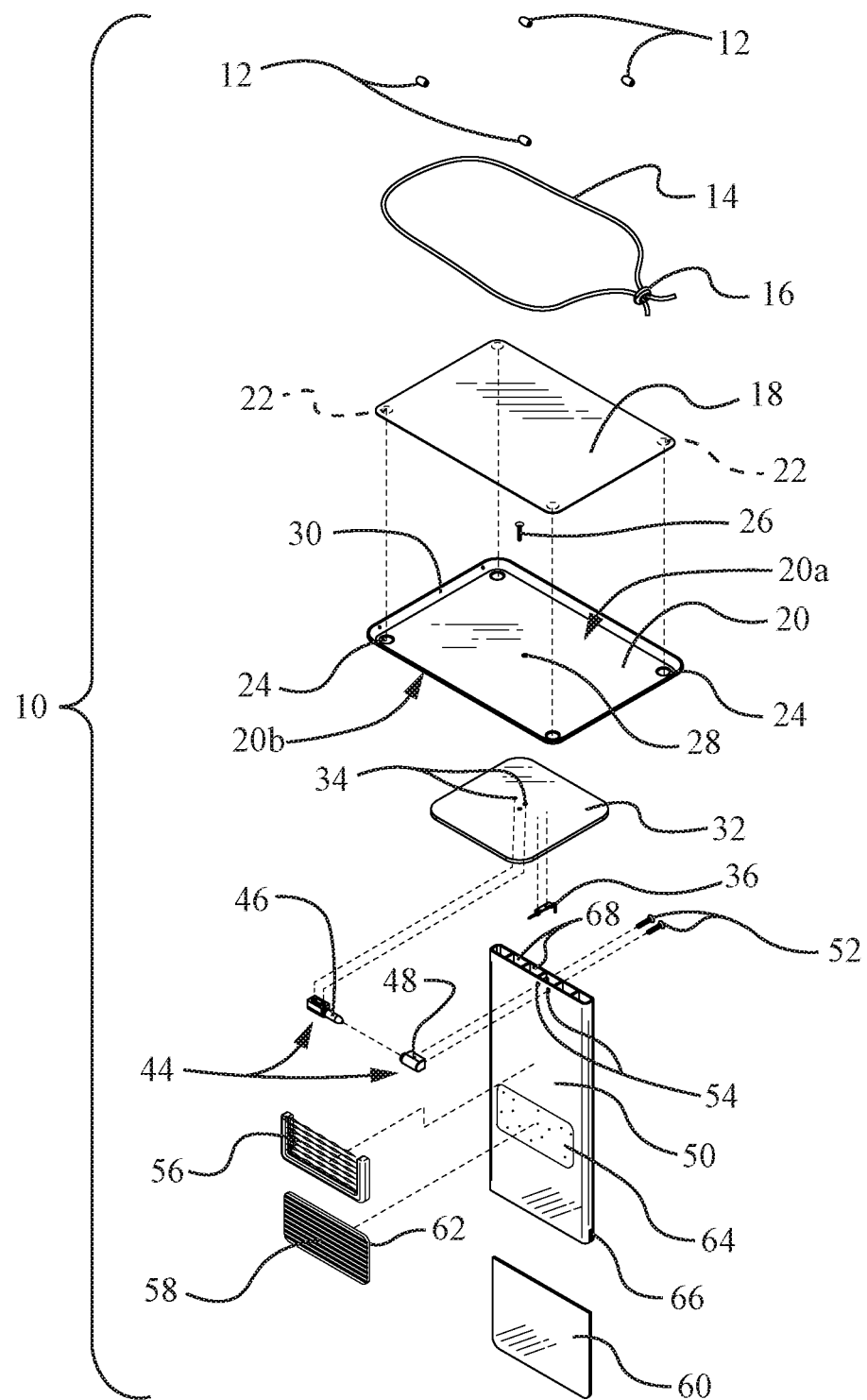
FIG. 12 is an overall exploded perspective view of the pivotable vehicle tray of FIG. 1.

Also, with reference to the perspective view of FIG. 1 and the exploded view of FIG. 12, in the illustrative embodiment, the pivotable vehicle tray 10 may further comprise a slip-resistant pad 18 disposed on the top surface 20a of the tray member 20. The slip-resistant pad 18 is configured to prevent one or more objects (e.g., paperwork 80—FIG. 13 or a laptop computer 82—FIG. 14) from sliding off the top surface 20a of the tray member 20. In the illustrative embodiment, the slip-resistant pad 18 may comprise a thin foam pad or a suitable polymeric pad. Also, as best shown in the exploded view of FIG. 12, a hook-and-loop fastener device 22, 24 may be used to removably attach the slip-resistant pad 18 to the top surface 20a of the tray member 20. In particular, the underside of the slip-resistant pad 18 may be provided with circular pieces of a first portion 22 of the hook-and-loop fastener device (e.g., the hard portion of the hook-and-loop attachment device with small hooks) disposed in each of the corners of the slip-resistant pad 18. The top surface 20a of the tray member 20 may be provided with corresponding circular pieces of a second portion 24 of the hook-and-loop fastener device (e.g., the soft portion of the hook-and-loop attachment device with tiny loops) disposed in each of the corners of the tray member 20. As such, the slip-resistant pad 18 is removably attachable to the top surface 20a of the tray member 20 by means of the first portion 22 of the hook-and-loop fastener device (e.g., the hard portion of the hook-and-loop attachment device with small hooks) engaging with the second portion 24 of the hook-and-loop fastener device (e.g., the soft portion of the hook-and-loop attachment device with tiny loops). In other embodiments, the slip-resistant pad 18 may comprise a hard plastic material that snaps onto the top surface 20a of the tray member 20.

In addition, in the illustrative embodiment, the tray member 20 further comprises one or more securement cords 14 configured to prevent a movement of one or more objects disposed on the top surface 20a of the tray member 20. For example, as shown in shown in FIG. 13, the securement cords 14 extend over the paperwork 80 (or book) so as to prevent the paperwork 80 from inadvertently falling off the tray member 20. In the illustrative embodiment, the one or more securement cords 14 of the tray member 20 may comprise an elastic cord (e.g., a bungee cord or shock cord) that wraps around the tray member 20 and is inserted through apertures in the upturned peripheral edge 30 of the tray member 20. The circumscribing elastic cord 14 defines two spaced-apart linear sections disposed across the top surface 20a of the tray member 20 (see FIG. 13) to hold the object (e.g., paperwork 80) in place on the tray member 20.

Figure 13:
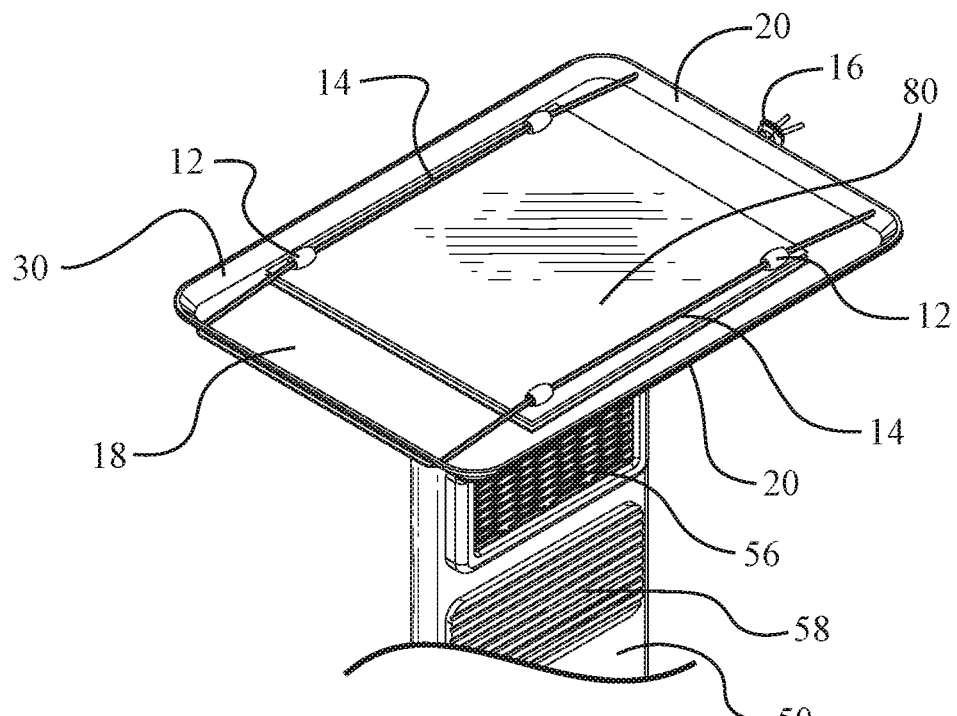
FIG. 13 is a partial top-side perspective view of the pivotable vehicle tray of FIG. 1, wherein the tray member of the pivotable vehicle tray is shown being used to support paperwork thereon.
Figure 14:
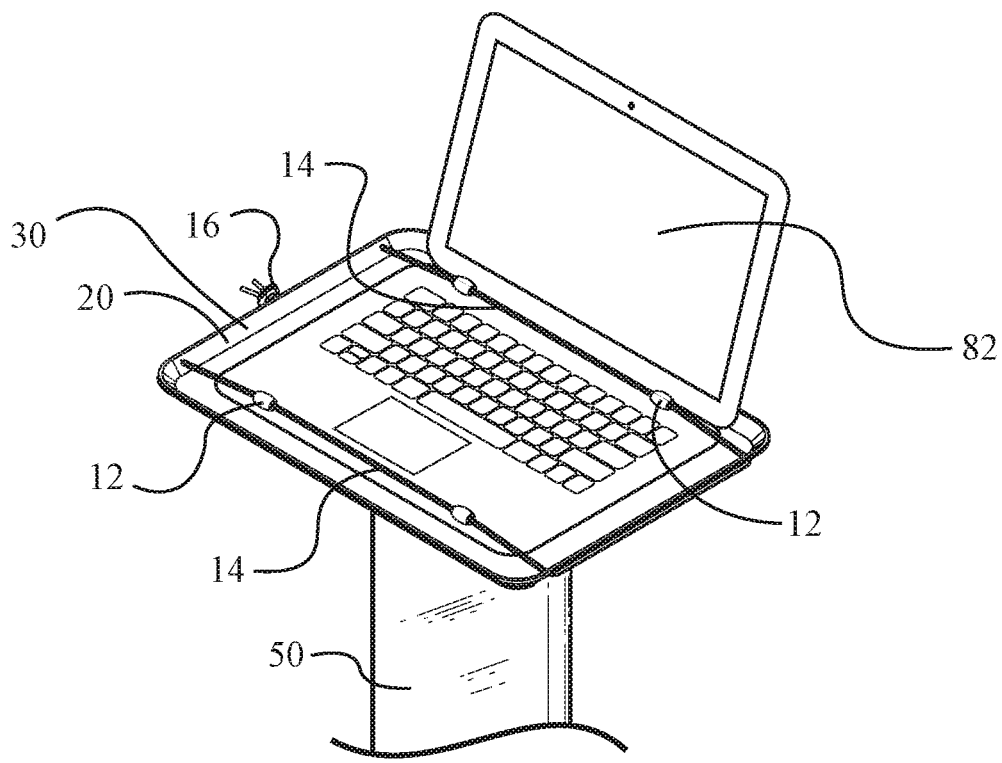
FIG. 14 is another partial top-side perspective view of the pivotable vehicle tray of FIG. 1, wherein the tray member of the pivotable vehicle tray is shown being used to a laptop computer thereon.

As shown in the illustrative embodiment of FIG. 1, the securement cord 14 may be provided with barrel-shaped cord beads 12 disposed thereon, which are configured to press again the top surface of the object (e.g., paperwork 80) being held on the tray member 20 so as to help hold the object down. In addition, with combined reference to FIGS. 1, 12, and 13, the two loose ends of the securement cord 14 may be joined together using a cord connector member 16. In FIG. 13, the pivotable vehicle tray 10 is being viewed from the passenger side of the vehicle, while, in FIG. 14, the pivotable vehicle tray 10 is being viewed from the driver side of the vehicle.

Now, with reference to FIGS. 9-12, it can be seen that, in the illustrative embodiment, the pivotable vehicle tray 10 further comprises a hinge member 44 that pivotably couples the tray mounting plate 32 to the vertical support member 50. In the illustrative embodiment, the horizontal rotational axis about which the tray member 20 is pivotally collapsible is defined through the center of the hinge member 44 (i.e., the horizontal rotational axis extends longitudinally through the center of the hinge member 44). As best shown in FIGS. 11 and 12, in the illustrative embodiment, the hinge member 44 of the pivotable vehicle tray 10 has a two-part construction with a male portion 46 and a female portion 48. As a result of this two-part construction of the hinge member 44, as shown in FIG. 11, the tray member 20 can be completely removed from the vertical support member 50 by removing the male portion 46 of the hinge member 44 from the female portion 48 of the hinge member 44. Referring again to the exploded view of FIG. 12, it can be seen that the tray mounting plate 32 is provided a pair of spaced-apart apertures 34 disposed therein for receiving fastener members (e.g., screws or bolts) that attach the male portion 46 of the hinge member 44 to the underside of the tray mounting plate 32. Similarly, with combined reference to FIGS. 2 and 12, it can be seen that the vertical support member 50 is provided a pair of spaced-apart apertures 54 disposed therein for receiving fastener members 52 (e.g., screws or bolts) that attach the female portion 48 of the hinge member 44 to the side of the vertical support member 50. In this manner, the male and female portions 46, 48 of the illustrative hinge member 44 are secured to their respective components 32, 50 of the pivotable vehicle tray 10.

Figure 6:
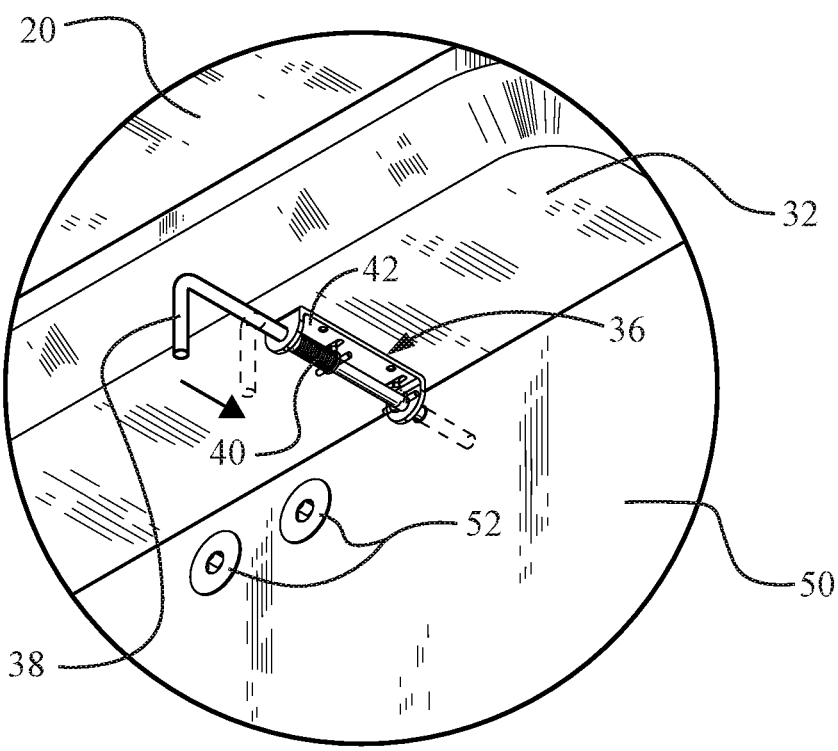
FIG. 6 is an enlarged perspective view illustrating the tray latch member of the pivotable vehicle tray illustrated in FIG. 2 (Detail "A"), wherein the tray latch member is depicted in its latched state such that the tray member is maintained in its operative horizontal position.
Figure 7:
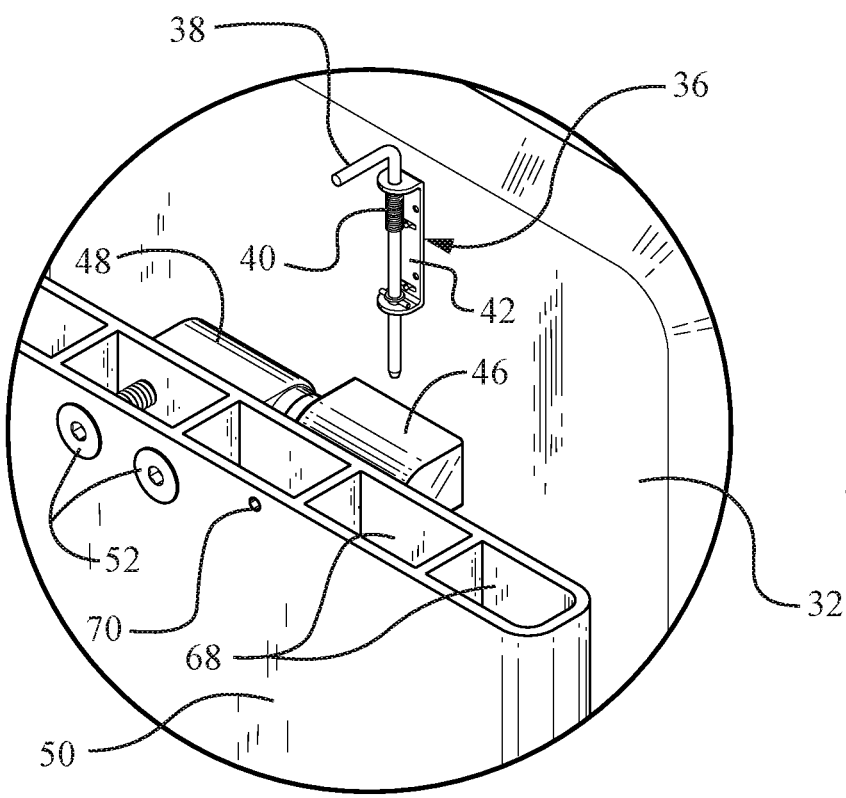
FIG. 7 is an enlarged perspective view similar to that of FIG. 6 (Detail "B"), except that the tray latch member is depicted in its unlatched state with the tray member in its collapsed position.

Next, with reference to FIGS. 2, 6, 7, and 12, it can be seen that, in the illustrative embodiment, the pivotable vehicle tray 10 further comprises a latching device 36 that latches the tray member 20 in place relative to the vertical support member 50. That is, the latching device 36 is configured to prevent the rotation of the tray member 20 about the horizontal rotational axis of the tray so as to maintain the tray member 20 in the operative horizontal position (i.e., the tray position in FIGS. 1 and 2). As best shown in FIGS. 6 and 7, in the illustrative embodiment, the latching device 36 of the pivotable vehicle tray 10 has an L-shaped handle/rod 38 that is supported in a base portion 42. In FIG. 6, it can be seen that the latching device 36 is further provided with a spring 40 for biasing the L-shaped handle/rod 38 in the engaged position where the distal end of the L-shaped handle/rod 38 is disposed in the latch aperture 70 (see FIG. 7) of the vertical support member 50, thereby maintaining the tray member 20 in the operative horizontal position. In order to disengage the latching device 36 so that the tray member 20 can be freely rotated to its collapsed vertical position, a user simply pulls on the end of the L-shaped handle/rod 38, which results in the compression of the spring 40, and the removal of the distal end of the L-shaped handle/rod 38 from the latch aperture 70.

Figure 17:
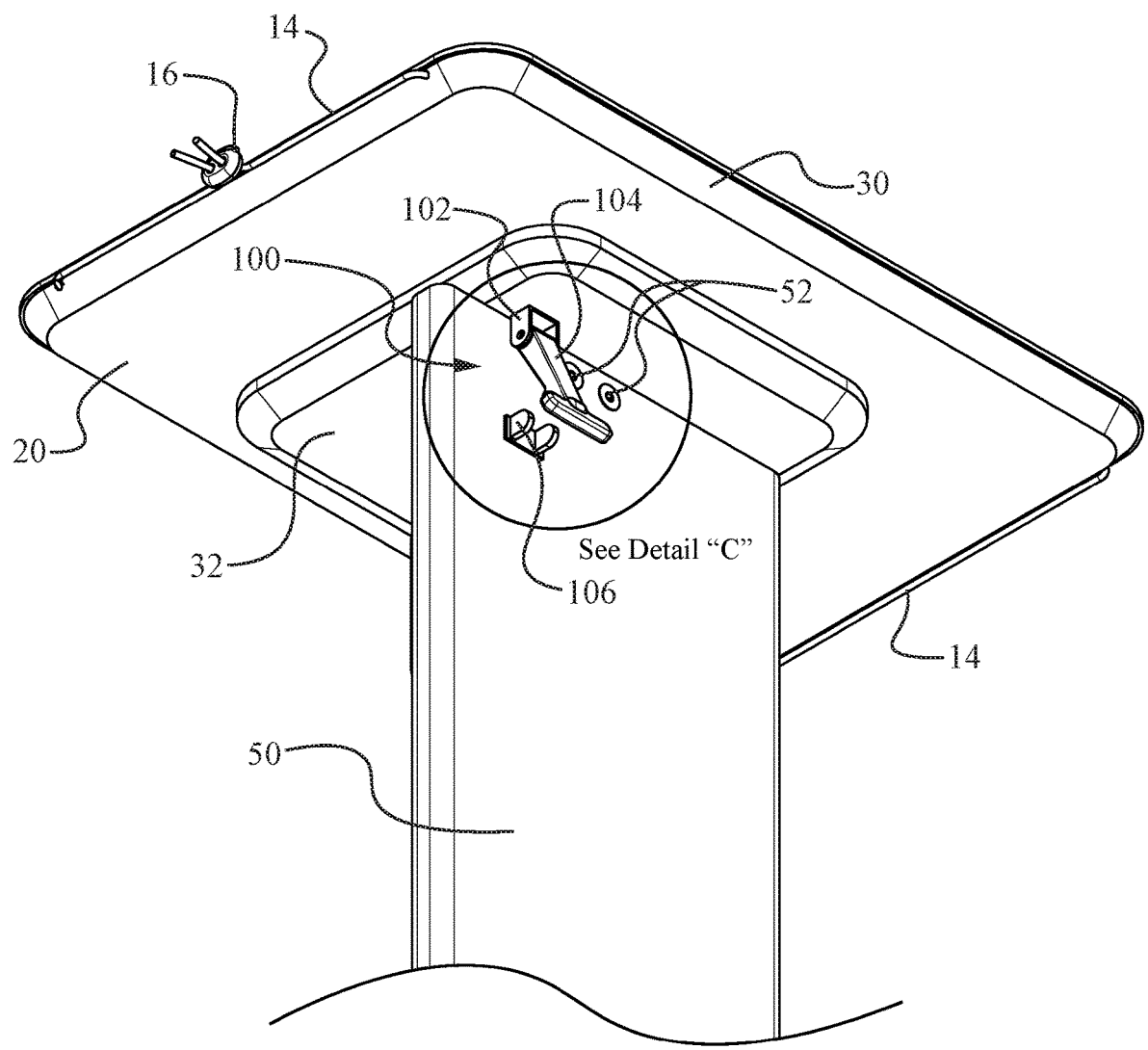
FIG. 17 is a bottom-side perspective view of a pivotable vehicle tray similar to FIG. 1, except utilizing an alternative type of latching device.
Figure 18:
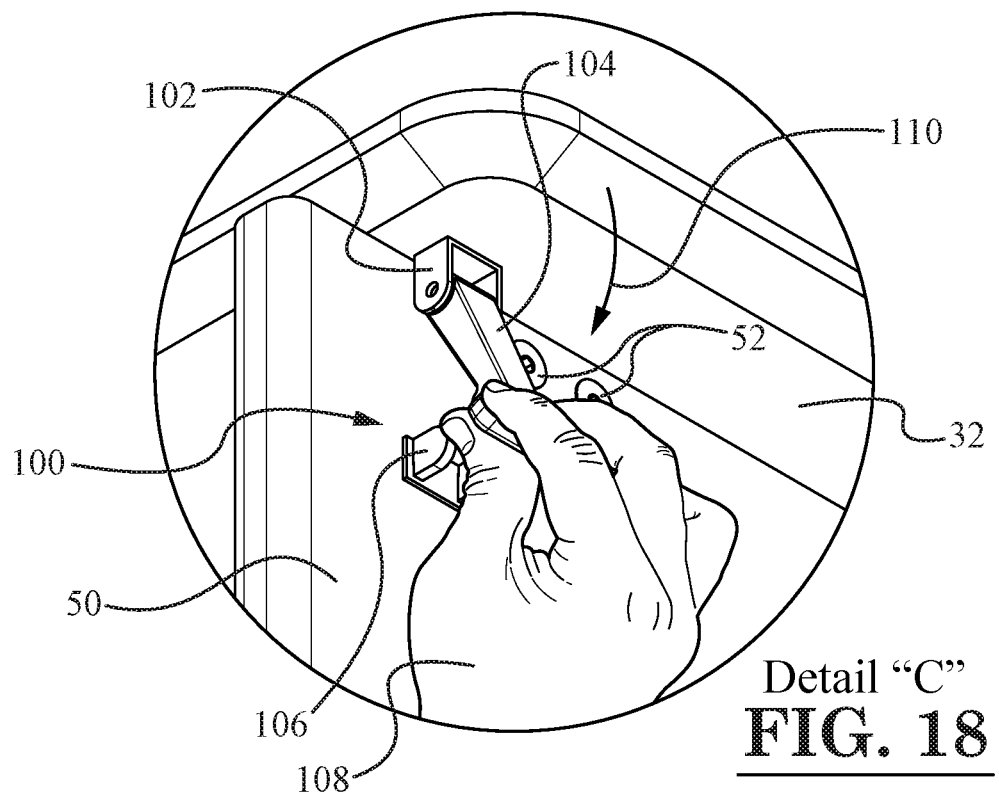
FIG. 18 is an enlarged perspective view illustrating the alternative latching device illustrated in FIG. 17 (Detail "C"), wherein a user is shown engaging the tray latch member of the latching device.
Figure 19:
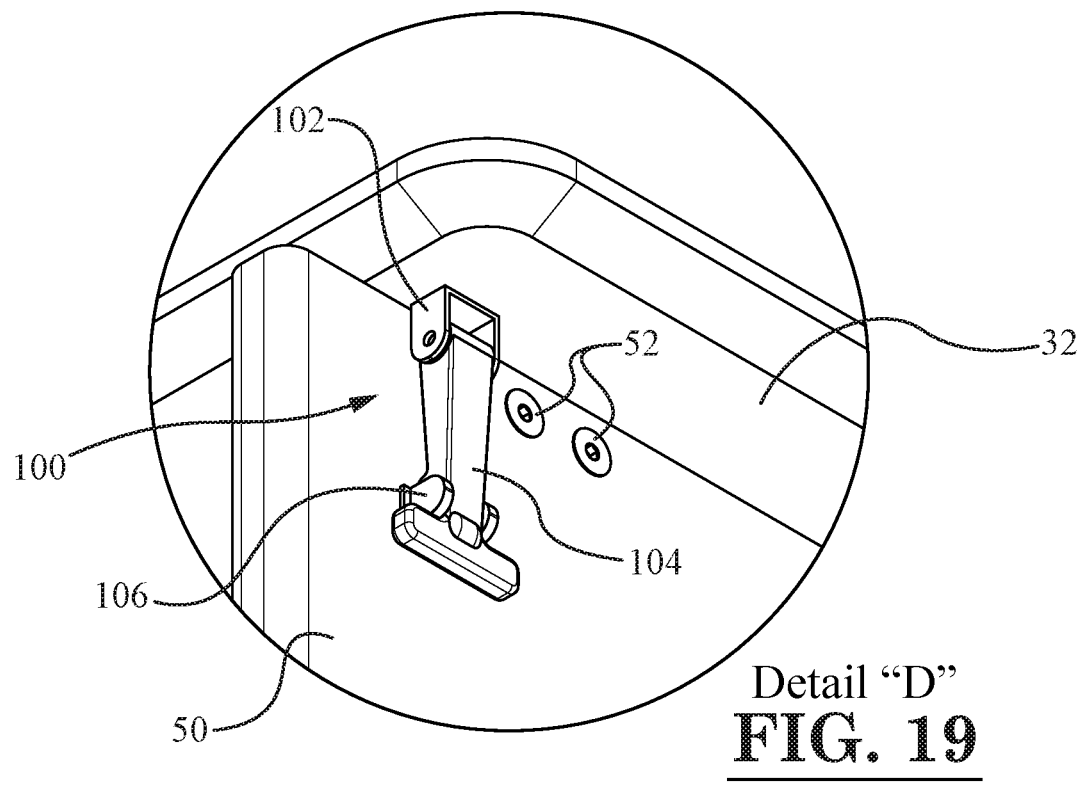
FIG. 19 is an enlarged perspective view similar to that of FIG. 18 (Detail "D"), wherein the tray latch member is depicted in its latched state such that the tray member is maintained in its operative horizontal position.

An alternative type of latching device 100 that may be used with the pivotable vehicle tray 10 is illustrated in FIGS. 17-19. Like the latching device 36 described above, the latching device 100 latches the tray member 20 in place relative to the vertical support member 50. That is, the latching device 100 is configured to prevent the rotation of the tray member 20 about the horizontal rotational axis of the tray so as to maintain the tray member 20 in the operative horizontal position (i.e., the tray position in FIGS. 1 and 2). As shown in FIGS. 17-19, in the alternative embodiment, the latching device 100 of the pivotable vehicle tray 10 has a tray latch member 104 that is pivotably coupled to a base member 102. In these figures, it can be seen that the latching device 100 further includes a bracket member 106 that tray latch member 104 engages when the tray latch member 104 is in its engaged position (i.e., the engaged position of FIG. 19). As shown in FIG. 18, in order to engage the latching device 100 so that the tray member 20 is maintained in its operative horizontal position, a user grasps the tray latch member 104 and rotates the tray latch member 104 with his or her hand 108 in a first rotational direction (e.g., in a clockwise direction as diagrammatically represented by the curved arrow 110 in FIG. 18) until the tray latch member 104 engages with the bracket member 106. In order to disengage the latching device 100 so that the tray member 20 can be freely rotated to its collapsed vertical position, the user grasps the tray latch member 104 and rotates the tray latch member 104 in a second rotational direction (e.g., in a counter-clockwise direction) until the tray latch member 104 is disengaged from the bracket member 106. In the alternative illustrative embodiment, the latching device 100 may comprise a hood latch mechanism where the tray latch member 104 is formed from a durable rubber material, and the base member 102 and bracket member 106 are formed from a zinc-plated metal.

In the illustrative embodiment, with combined reference to FIGS. 2, 5, 7, 10, and 12, it can be seen that the vertical support member 50 of the pivotable vehicle tray 10 may be formed from a hollow member with a plurality of internal cavities 68 divided by internal walls or webs. For example, in the illustrative embodiment, the vertical support member 50 may be molded from a polymeric material or plastic with internal cavities. The hollow construction of the vertical support member 50 advantageously minimizes the overall weight of the pivotable vehicle tray 10. In other embodiments, the vertical support member 50 may be formed from a solid member, rather than from hollow honeycomb material with a plurality of internal cavities.

Figures 3, 4:
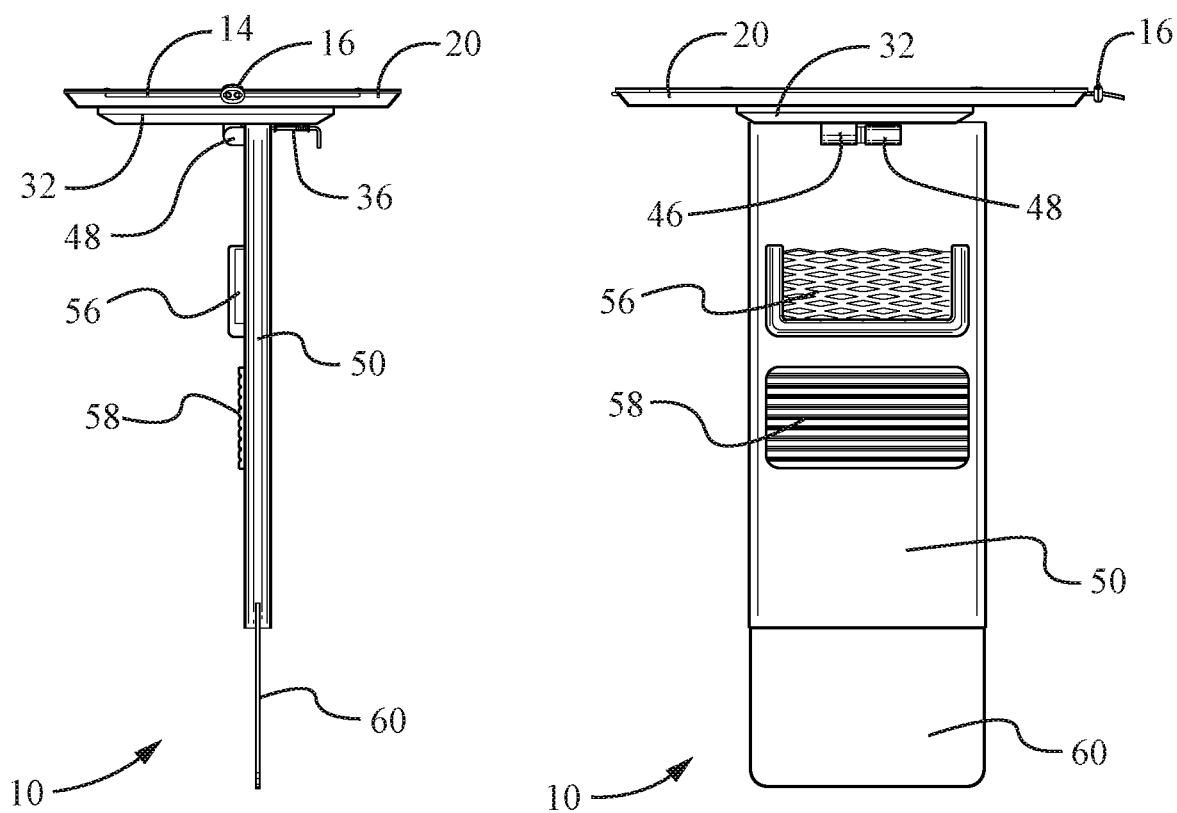
FIG. 3 is an end view of the pivotable vehicle tray of FIG. 1.
FIG. 4 is a side view of the pivotable vehicle tray of FIG. 1.

Further, in the illustrative embodiment, the pivotable vehicle tray 10 may further comprise a mobile phone holder 56 disposed on a side of the vertical support member 50 (refer to FIGS. 1, 4, and 12). The mobile phone holder 56 defines a pocket for accommodating a mobile phone (e.g., a cellular phone or smartphone) in the pocket. Advantageously, the mobile phone holder 56 allows the mobile phone of the user to be stowed in an easily accessible place in the vehicle. Referring again to FIGS. 1, 8, and 12, the pivotable vehicle tray 10 may additionally comprise a detachable insert member 58 disposed below, and on the same side of the vertical support member 50 as the mobile phone holder 56. The detachable insert member 58 is advantageously configured to enable the vertical support member 50 to fit more snugly in the space 92 between the seat 86 of the vehicle and the console 88 of the vehicle (see FIG. 15) when there is extra space between the seat 86 and the console 88. In the illustrative embodiment, the detachable insert member 58 is configured to be selectively attached to, and detached from, the vertical support member 50 by a user. For example, as best shown in the exploded view of FIG. 12, a hook-and-loop fastener device 62, 64 may be used to removably attach the detachable insert member 58 to the side surface of the vertical support member 50. In particular, the backside of the detachable insert member 58 may be provided with a first portion 62 of the hook-and-loop fastener device (e.g., the hard portion of the hook-and-loop attachment device with small hooks). The side surface of the vertical support member 50 may be provided with a second portion 64 of the hook-and-loop fastener device (e.g., the soft portion of the hook-and-loop attachment device with tiny loops). As such, the detachable insert member 58 is removably attachable to the side surface of the vertical support member 50 by means of the first portion 62 of the hook-and-loop fastener device (e.g., the hard portion of the hook-and-loop attachment device with small hooks) engaging with the second portion 64 of the hook-and-loop fastener device (e.g., the soft portion of the hook-and-loop attachment device with tiny loops). In the illustrative embodiment, the detachable insert member 58 may comprise a thin foam pad, a suitable polymeric pad, or suitable rubber pad. In other embodiments, the detachable insert member 58 may be substantially larger than that which is shown in the illustrative embodiment. Also, the detachable insert member 58 may be provided in different locations on the vertical support member 50 in other embodiments.

Figure 10:
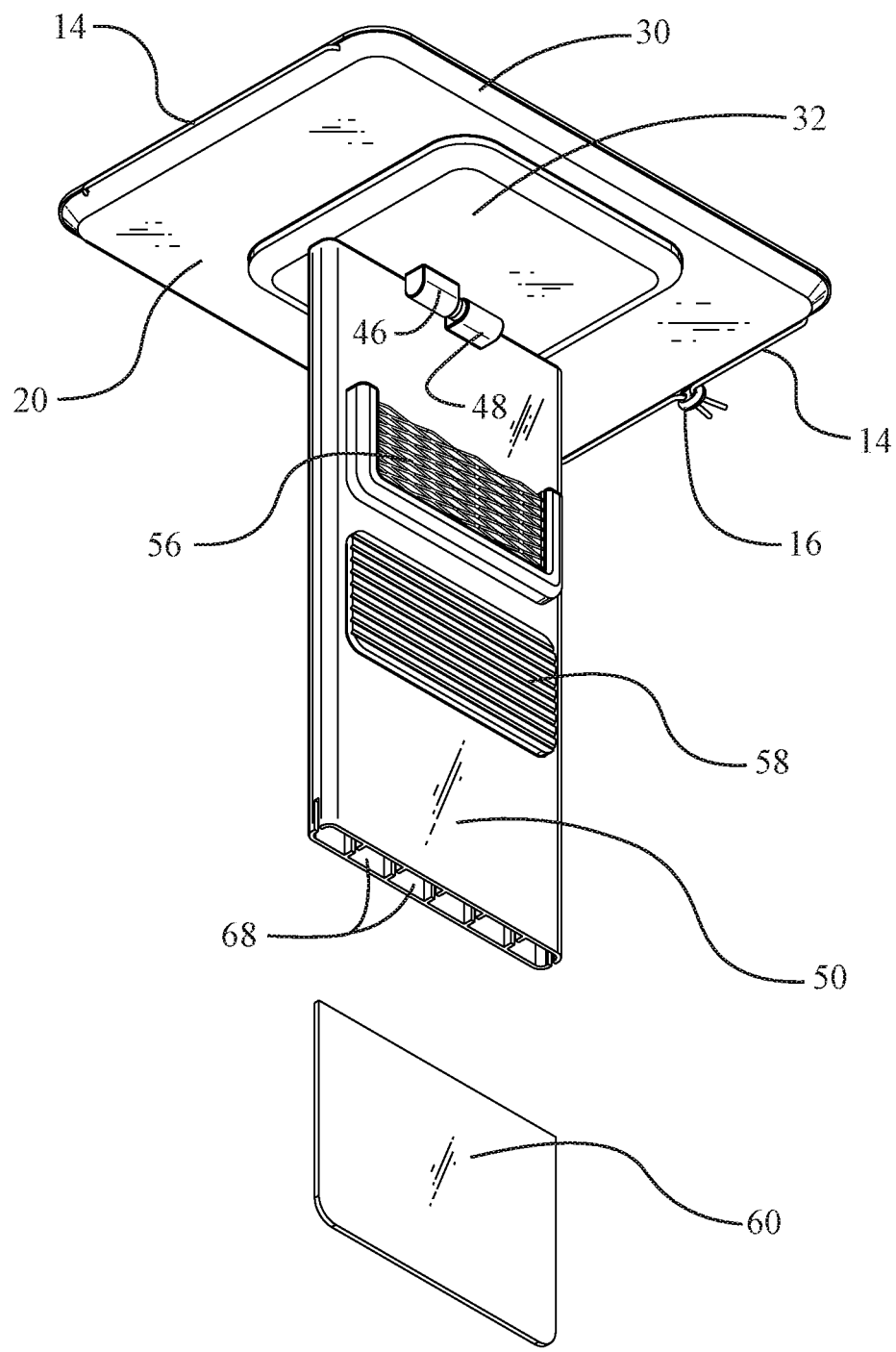
FIG. 10 is yet another bottom-side perspective view of the pivotable vehicle tray of FIG. 1, wherein the extension member of the pivotable vehicle tray is shown exploded from the remainder of the pivotable vehicle tray.

Turning to FIGS. 1, 10, and 12, it can be seen that the pivotable vehicle tray 10 may further comprise a vertical extension member 60 in the illustrative embodiment. As best shown in FIGS. 10 and 12, the vertical extension member 60 is configured to be attached to a bottom edge of the vertical support member 50 by virtue of the top edge portion of the vertical extension member 60 being received within a slot 66 disposed in the bottom end of the vertical support member 50. The vertical extension member 60 is used when a user has a vehicle with a particularly deep space 92 between the seat 86 of the vehicle and the console 88 of the vehicle (see FIG. 15). For example, the space 92 may be deep in certain trucks and sport utility vehicles (SUVs). In such a situation, the vertical extension member 60 is configured to increase an overall height of the tray member 20 relative to a floorboard 90 of the vehicle so as to enable the pivotable vehicle tray 10 to accommodate the deep space 92 between the seat 86 of the vehicle and the console 88 of the vehicle. In the illustrative embodiment, the vertical extension member 60 may be formed from a suitable polymeric material or plastic. Alternatively, the vertical extension member 60 may be formed from a piece of foam core board.

Figure 15:
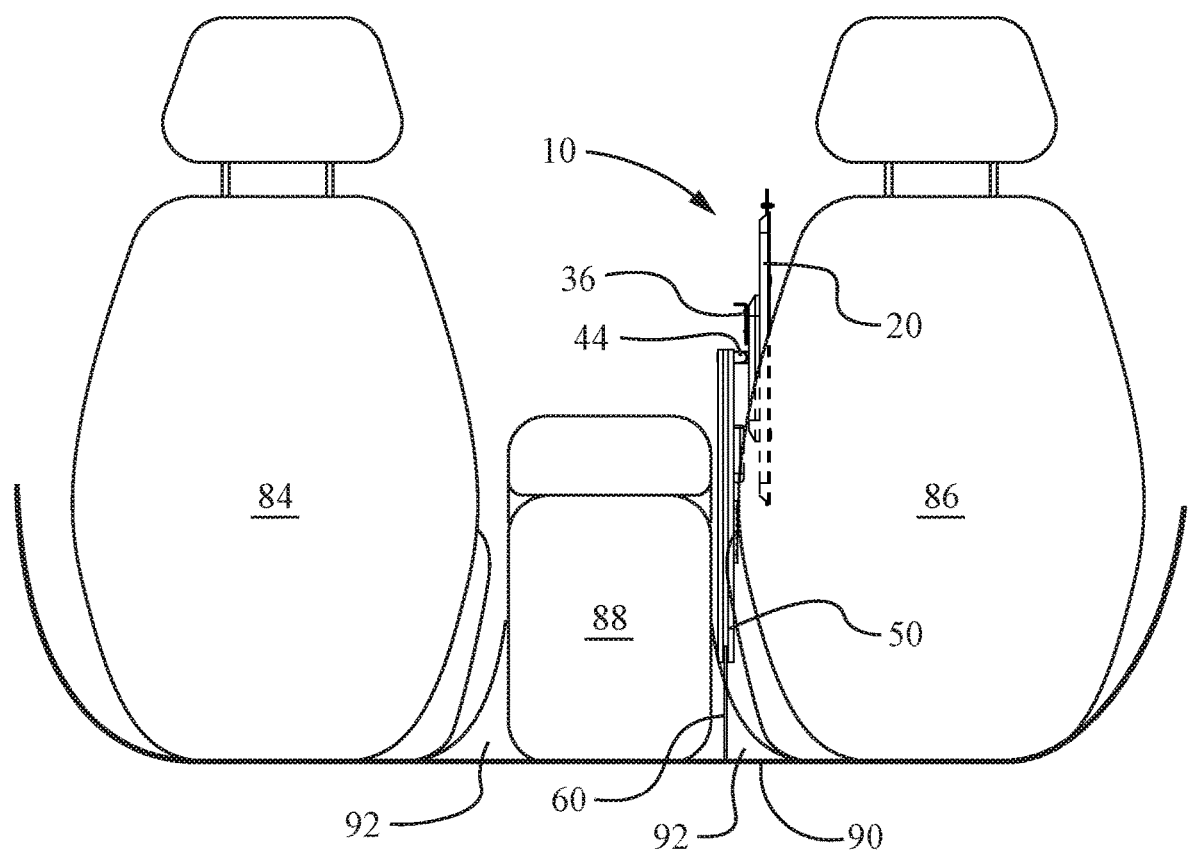
FIG. 15 is a rear elevational view depicting the two front seats and center console in a vehicle, wherein the pivotable vehicle tray of FIG. 1 is shown disposed in the gap between the center console and the front passenger seat of the vehicle.
Figure 16:
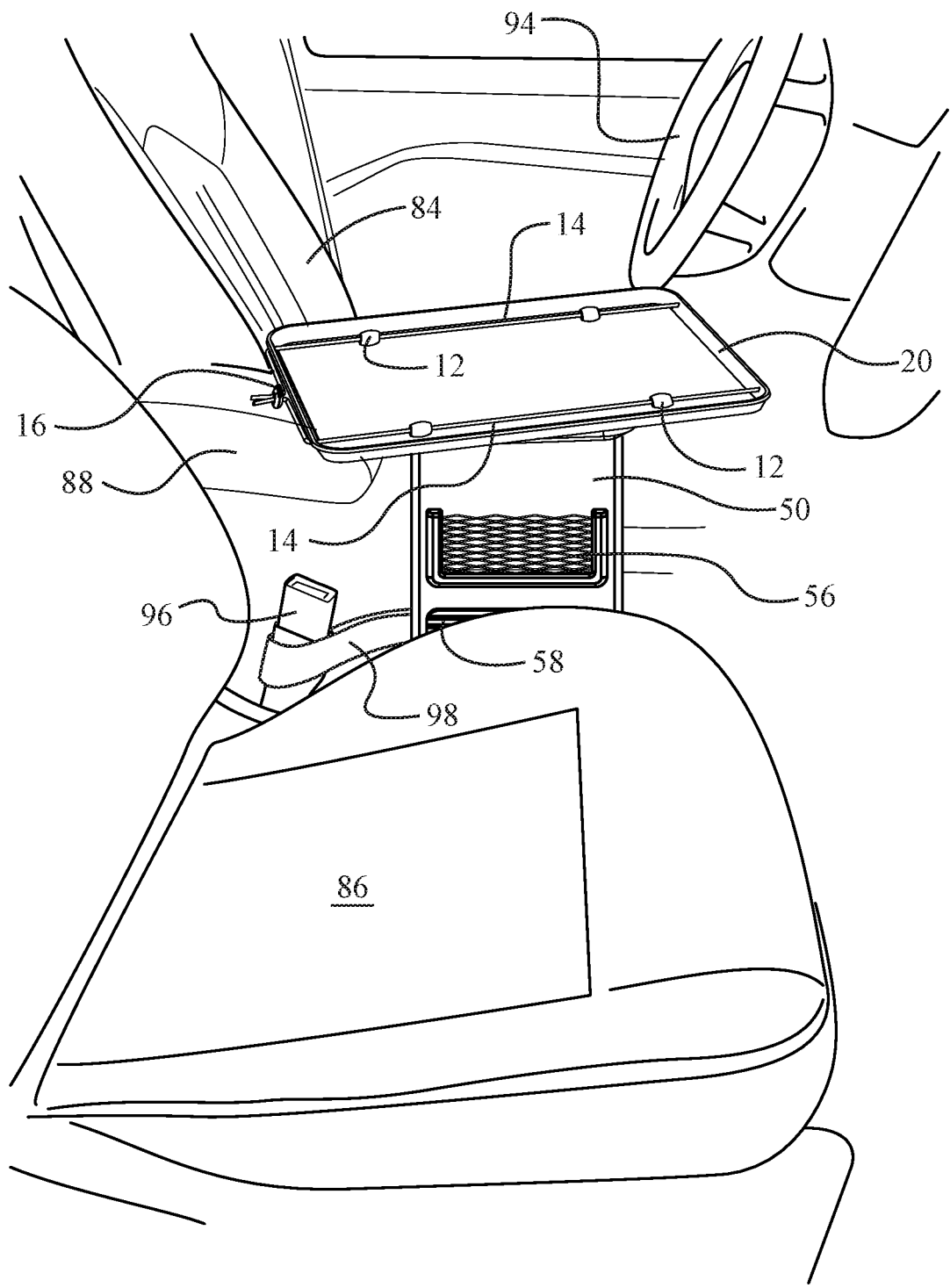
FIG. 16 is a perspective view of the interior of a vehicle passenger compartment, wherein the pivotable vehicle tray of FIG. 1 is shown being secured to the front passenger seat belt buckle so as to prevent the pivotable vehicle tray from becoming inadvertently dislodged from the gap between the center console and the front passenger seat of the vehicle.

As shown in FIG. 15, in the illustrative embodiment, the pivotable vehicle tray 10 is positioned in the space 92 between the passenger seat 86 of the vehicle and the center console 88 of the vehicle. Although, in other embodiments, the pivotable vehicle tray 10 may be alternatively positioned in the space 92 between the driver seat 84 of the vehicle and the center console 88 of the vehicle. FIG. 15 depicts a rear elevational view of the two front seats 84, 86 of a vehicle (i.e., looking at the rear sides of the front seats 84, 86 from the back seat of the vehicle). Turning to FIG. 16, it can be seen that the pivotable vehicle tray 10 may further comprise a flexible connector strap 98 attached to the vertical support member 50 for securing the pivotable vehicle tray 10 to a seat belt receptacle 96 of the vehicle so as to prevent the movement of the pivotable vehicle tray 10 in the vehicle. FIG. 16 depicts a front interior portion of the vehicle passenger compartment, which includes the driver seat 84, the passenger seat 86, and the steering wheel 94 of the vehicle. In other embodiments, the connector strap 98 may be in the form of an elastic cord (e.g., a bungee cord or shock cord) that wraps around the seat belt receptacle 96 and uses a cord lock member (similar to connector 16 above), rather than being in the form of the strap depicted in FIG. 16.

In one or more other embodiments, a rubber pen/pencil holder may be provided as an accessory to the pivotable vehicle tray 10 so that a pen or pencil can be removably attached to the pivotable vehicle tray 10 so as to prevent the pen or pencil from being lost during travel. The rubber pen/pencil holder accessory may be provided with an adhesive backing so as to enable the rubber pen/pencil holder to be stuck to a component of the pivotable vehicle tray 10 (e.g., to the tray member 20).

It is readily apparent that the aforedescribed pivotable vehicle tray 10 offers numerous advantages. First, the pivotable vehicle tray 10 is able to provide a generally flat working surface and/or eating surface for accommodating various tasks in a vehicle passenger compartment. Secondly, the aforedescribed pivotable vehicle tray 10 is collapsible so as to not interfere with the typical use of the vehicle passenger compartment when the vehicle tray is not being used. Finally, the pivotable vehicle tray 10 is configured to be inserted in a space between a seat of the vehicle and a console of the vehicle so as to be readily accessible to a user (e.g., a driver of the vehicle).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A pivotable vehicle tray, comprising:
   a tray member, the tray member having a top surface and a bottom surface oppositely disposed relative to the top surface, the top surface configured to function as a work surface and/or an eating surface for accommodating a driver or passenger in a vehicle;
   a vertical support member coupled to the bottom surface of the tray member, the vertical support member configured to be inserted in a space between a seat of the vehicle and a console of the vehicle, the tray member being pivotable relative to the vertical support member; and
   a detachable insert member disposed on a side of the vertical support member, the detachable insert member configured to be selectively attached to, and detached from, the vertical support member by a user, the detachable insert member configured to enable the vertical support member to fit more snugly in the space between the seat of the vehicle and the console of the vehicle.

2. The pivotable vehicle tray according to claim 1, wherein the tray member comprises one or more securement cords configured to prevent a movement of one or more objects disposed on the top surface of the tray member.

3. The pivotable vehicle tray according to claim 1, further comprising a slip-resistant pad disposed on the top surface of the tray member, the slip-resistant pad configured to prevent one or more objects from sliding off the top surface of the tray member.

4. The pivotable vehicle tray according to claim 1, wherein the tray member is pivotable relative to the vertical support member about a vertical rotational axis.

5. The pivotable vehicle tray according to claim 1, wherein the tray member comprises an upturned peripheral edge disposed about a periphery of the tray member, the upturned peripheral edge configured to prevent one or more objects from sliding off the top surface of the tray member.

6. The pivotable vehicle tray according to claim 1, further comprising a tray mounting plate attached to the bottom surface of the tray member, the tray mounting plate being pivotably coupled to the vertical support member.

7. The pivotable vehicle tray according to claim 6, further comprising a hinge member pivotably coupling the tray mounting plate to the vertical support member, the hinge member defining a horizontal rotational axis about which the tray member is rotatable, the tray member being rotatable between an operative horizontal position and a collapsed vertical position.

8. The pivotable vehicle tray according to claim 7, further comprising a latching device, the latching device configured to prevent the rotation of the tray member about the horizontal rotational axis so as to maintain the tray member in the operative horizontal position.

9. The pivotable vehicle tray according to claim 1, further comprising a mobile phone holder disposed on a side of the vertical support member, the mobile phone holder defining a pocket for accommodating a mobile phone in the pocket.

10. The pivotable vehicle tray according to claim 1, further comprising a vertical extension member configured to be attached to a bottom edge of the vertical support member, the vertical extension member configured to increase an overall height of the tray member relative to a floor of the vehicle so as to enable the pivotable vehicle tray to accommodate a deep space between the seat of the vehicle and the console of the vehicle.

11. The pivotable vehicle tray according to claim 1, further comprising a connector strap configured to secure the vertical support member of the pivotable vehicle tray to a seat belt receptacle of the vehicle so as to prevent the movement of the pivotable vehicle tray in the vehicle.

12. A pivotable vehicle tray, comprising:
  a tray member, the tray member having a top surface and a bottom surface oppositely disposed relative to the top surface, the top surface configured to function as a work surface and/or an eating surface for accommodating a driver or passenger in a vehicle;
  a vertical support member coupled to the bottom surface of the tray member, the vertical support member configured to be inserted in a space between a seat of the vehicle and a console of the vehicle, the tray member being pivotable about a horizontal rotational axis relative to the vertical support member between an operative horizontal position and a collapsed vertical position;
  a vertical extension member configured to be attached to a bottom end portion of the vertical support member, the vertical extension member configured to increase an overall height of the tray member relative to a floor of the vehicle so as to enable the pivotable vehicle tray to accommodate a deep space between the seat of the vehicle and the console of the vehicle, the vertical support member configured to be stationary relative to the vertical extension member when attached to the vertical extension member such that the vertical support member and the vertical extension member cannot move relative to one another; and
  a detachable insert member disposed on a side of the vertical support member, the detachable insert member configured to be selectively attached to, and detached from, the vertical support member by a user, the detachable insert member configured to enable the vertical support member to fit more snugly in the space between the seat of the vehicle and the console of the vehicle.

13. The pivotable vehicle tray according to claim 12, wherein the tray member is further pivotable relative to the vertical support member about a vertical rotational axis.

14. The pivotable vehicle tray according to claim 12, wherein the tray member comprises an upturned peripheral edge disposed about a periphery of the tray member, the upturned peripheral edge configured to prevent one or more objects from sliding off the top surface of the tray member.

15. The pivotable vehicle tray according to claim 12, further comprising a tray mounting plate attached to the bottom surface of the tray member, the tray mounting plate being pivotably coupled to the vertical support member about the horizontal rotational axis.

16. The pivotable vehicle tray according to claim 15, further comprising a hinge member pivotably coupling the tray mounting plate to the vertical support member, the horizontal rotational axis being defined by the hinge member.

17. The pivotable vehicle tray according to claim 16, further comprising a latching device, the latching device configured to prevent the rotation of the tray member about the horizontal rotational axis so as to maintain the tray member in the operative horizontal position.

18. The pivotable vehicle tray according to claim 12, further comprising a mobile phone holder disposed on a side of the vertical support member, the mobile phone holder defining a pocket for accommodating a mobile phone in the pocket.

19. The pivotable vehicle tray according to claim 12, wherein the bottom end portion of the vertical support member comprises a slot extending across a width of the vertical support member, and a top edge portion of the vertical extension member is received within the slot disposed in the bottom end portion of the vertical support member.

20. A pivotable vehicle tray, comprising:
  a tray member, the tray member having a top surface and a bottom surface oppositely disposed relative to the top surface, the top surface configured to function as a work surface and/or an eating surface for accommodating a driver or passenger in a vehicle;
  a vertical support member coupled to the bottom surface of the tray member, the vertical support member having a first side and a second side, the second side of the vertical support member being oppositely disposed relative to the first side of the vertical support member, the vertical support member configured to be inserted in a space between a seat of the vehicle and a console of the vehicle, the tray member being pivotable about a horizontal rotational axis relative to the vertical support member between an operative horizontal position and a collapsed vertical position;

a hinge member pivotably coupling the tray member to the vertical support member, the horizontal rotational axis being defined by the hinge member, the hinge member being disposed on the first side of the vertical support member; and a latching device, the latching device configured to prevent the rotation of the tray member about the horizontal rotational axis so as to maintain the tray member in the operative horizontal position, the latching device being disposed on the second side of the vertical support member such that the latching device is spaced apart from the hinge member by a thickness of the vertical support member; and a detachable insert member disposed on the first side of the vertical support member, the detachable insert member configured to be selectively attached to, and detached from, the vertical support member by a user, the detachable insert member configured to enable the vertical support member to fit more snugly in the space between the seat of the vehicle and the console of the vehicle.

* * * * *